(12) United States Patent
Newman

(10) Patent No.: US 9,458,800 B2
(45) Date of Patent: Oct. 4, 2016

(54) TURBO PUMP

(71) Applicant: JAGUAR LAND ROVER LIMITED, Warwickshire (GB)

(72) Inventor: Philip Newman, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 112 days.

(21) Appl. No.: 14/383,969

(22) PCT Filed: Mar. 8, 2013

(86) PCT No.: PCT/EP2013/054738
§ 371 (c)(1),
(2) Date: Sep. 9, 2014

(87) PCT Pub. No.: WO2013/135580
PCT Pub. Date: Sep. 19, 2013

(65) Prior Publication Data
US 2015/0020782 A1      Jan. 22, 2015

(30) Foreign Application Priority Data

Mar. 12, 2012   (GB) .................................. 1204323.8

(51) Int. Cl.
*F02B 47/08* (2006.01)
*F02M 25/07* (2006.01)
(Continued)

(52) U.S. Cl.
CPC ........ *F02M 25/0704* (2013.01); *F02B 37/001* (2013.01); *F02B 37/007* (2013.01); *F02B 37/18* (2013.01); *F02M 26/02* (2016.02); *F02M 26/08* (2016.02); *F02M 26/34* (2016.02); *F01N 5/04* (2013.01); *F02B 3/06* (2013.01); *F02M 25/0701* (2013.01); *F02M 25/0703* (2013.01);
(Continued)

(58) Field of Classification Search
CPC ........... F02M 25/0707; F02M 25/074; F02M 25/0701; F02M 25/0703; F02B 3/06
USPC ...................................... 123/568.11
See application file for complete search history.

(56) References Cited

U.S. PATENT DOCUMENTS 4,155,684 A       5/1979  Curiel et al.
4,594,906 A  *   6/1986  Vincent .................. B60K 17/28
                                                         192/17 R
(Continued)

FOREIGN PATENT DOCUMENTS

DE       202009002385 U1     5/2009
EP              0620365 A1    10/1994
(Continued)

OTHER PUBLICATIONS

International Search Report for International application No. PCT/EP2013/054738 mailed Jun. 20, 2013.
(Continued)

*Primary Examiner* — Lindsay Low
*Assistant Examiner* — Charles Brauch
(74) *Attorney, Agent, or Firm* — Carlson, Gaskey & Olds

(57) ABSTRACT

An exhaust turbo pump of an internal combustion engine has multiple pairs of turbine and compressor wheels rotatable about a common axis, an inner pair of wheels being connected by a tubular shaft rotatable relative to a spindle connecting an outer pair of wheels. One pair of wheels comprises a turbocharger for inlet air, and another pair of wheels comprises a low pressure EGR pump.

15 Claims, 10 Drawing Sheets

(51) Int. Cl.
*F02B 37/18* (2006.01)
*F02B 37/007* (2006.01)
*F02B 37/00* (2006.01)
F02B 3/06 (2006.01)
F01N 5/04 (2006.01)

(52) U.S. Cl.
CPC ....... *F02M25/0707* (2013.01); *F05D 2220/40* (2013.01); *Y02T 10/144* (2013.01)

(56) References Cited

U.S. PATENT DOCUMENTS

| | | | |
|---|---|---|---|
| 5,794,445 A | | 8/1998 | Dungner |
| 6,050,095 A | | 4/2000 | Blake |
| 6,145,313 A | * | 11/2000 | Arnold .................... F02B 37/00 60/605.2 |
| 2005/0023779 A1 | * | 2/2005 | Kalvelage ............... B62B 13/00 280/19 |
| 2006/0086090 A1 | | 4/2006 | Kilkenny et al. |
| 2007/0119171 A1 | | 5/2007 | Boyapati et al. |

FOREIGN PATENT DOCUMENTS

| | | |
|---|---|---|
| EP | 2218896 A1 | 8/2010 |
| GB | 1510070 | 5/1978 |
| JP | 2004060499 A | 2/2004 |
| WO | 2008013157 A1 | 1/2008 |
| WO | 2012063718 A1 | 5/2012 |

OTHER PUBLICATIONS

Combined Search and Examination Report under Section 17 and 18(3) for Application No. GB1204323.8 dated Jul. 2, 2012.

* cited by examiner

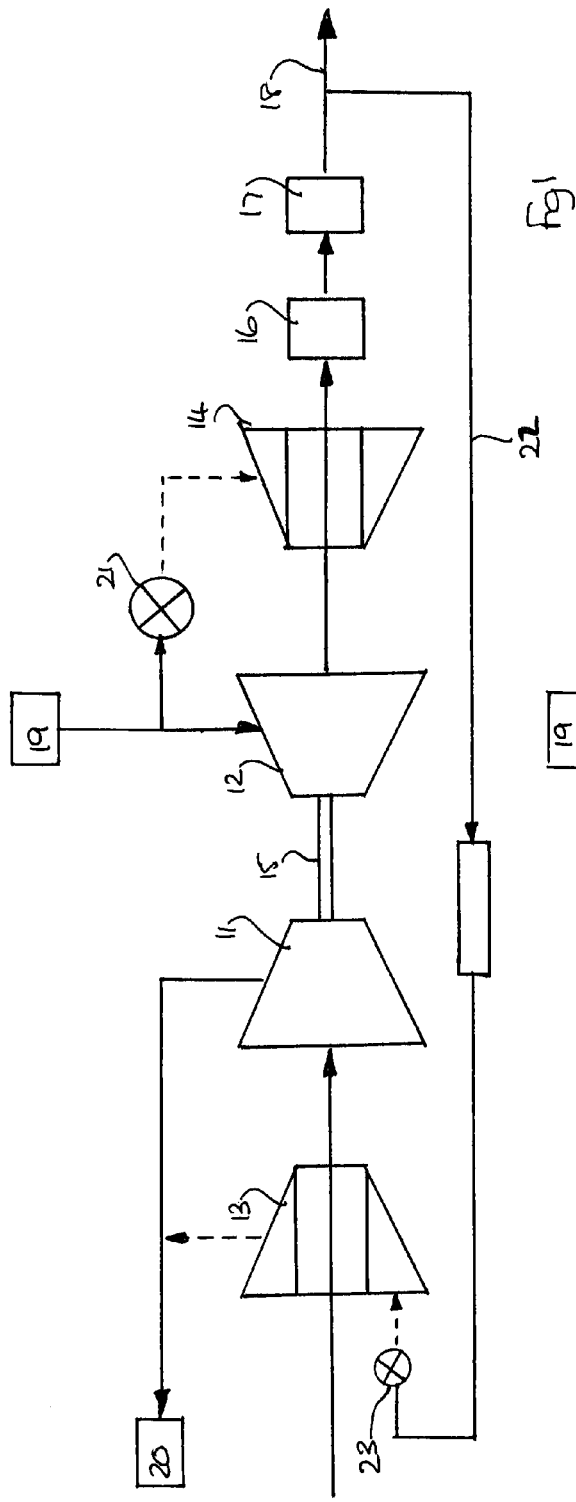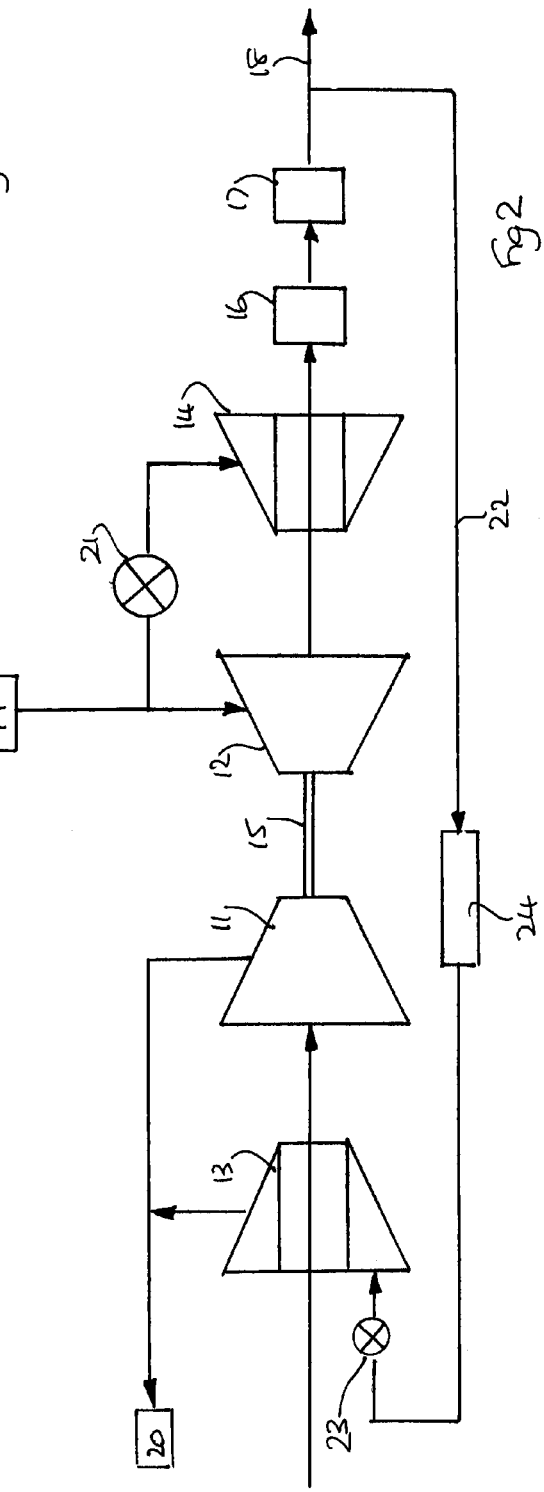

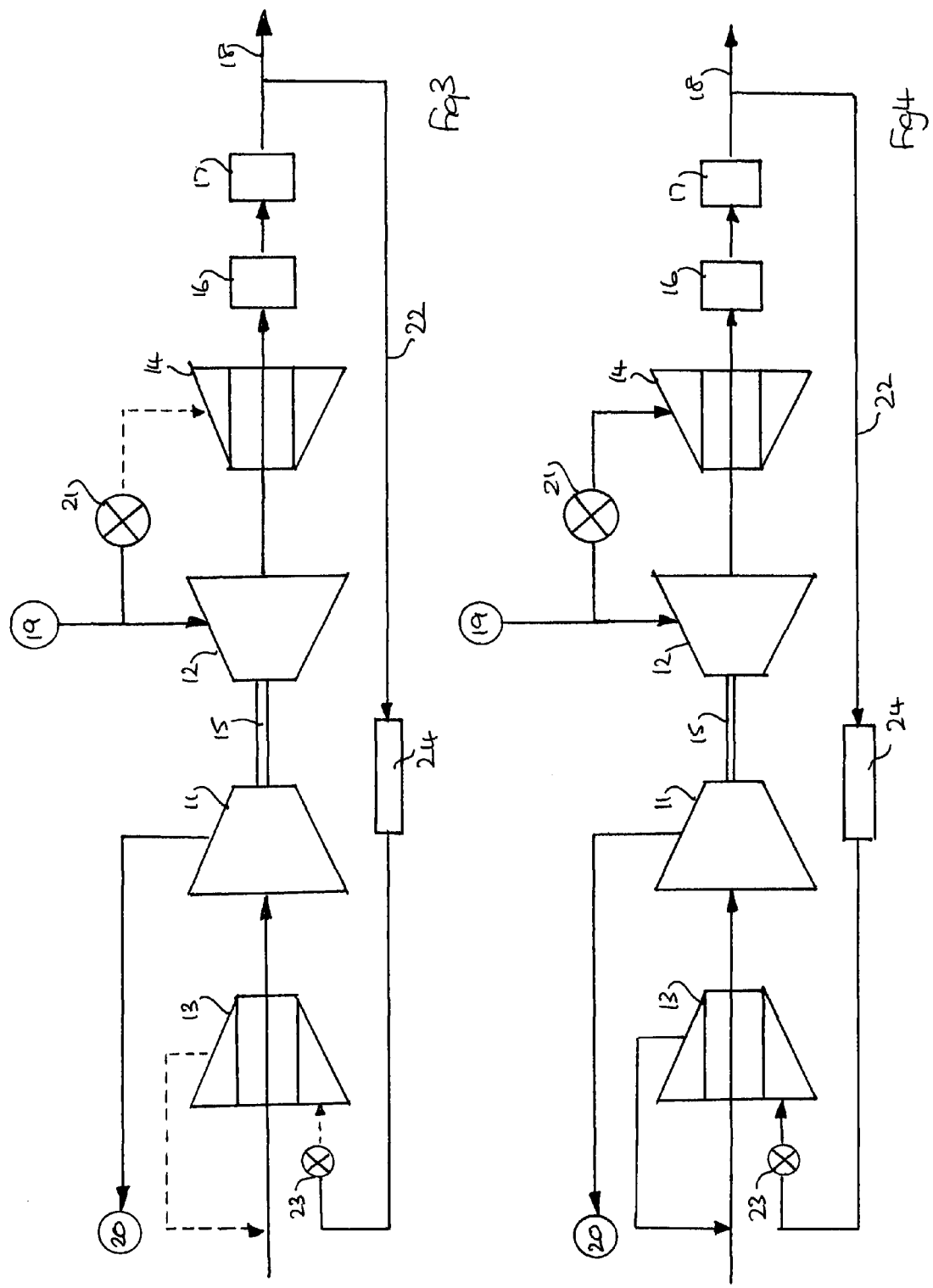

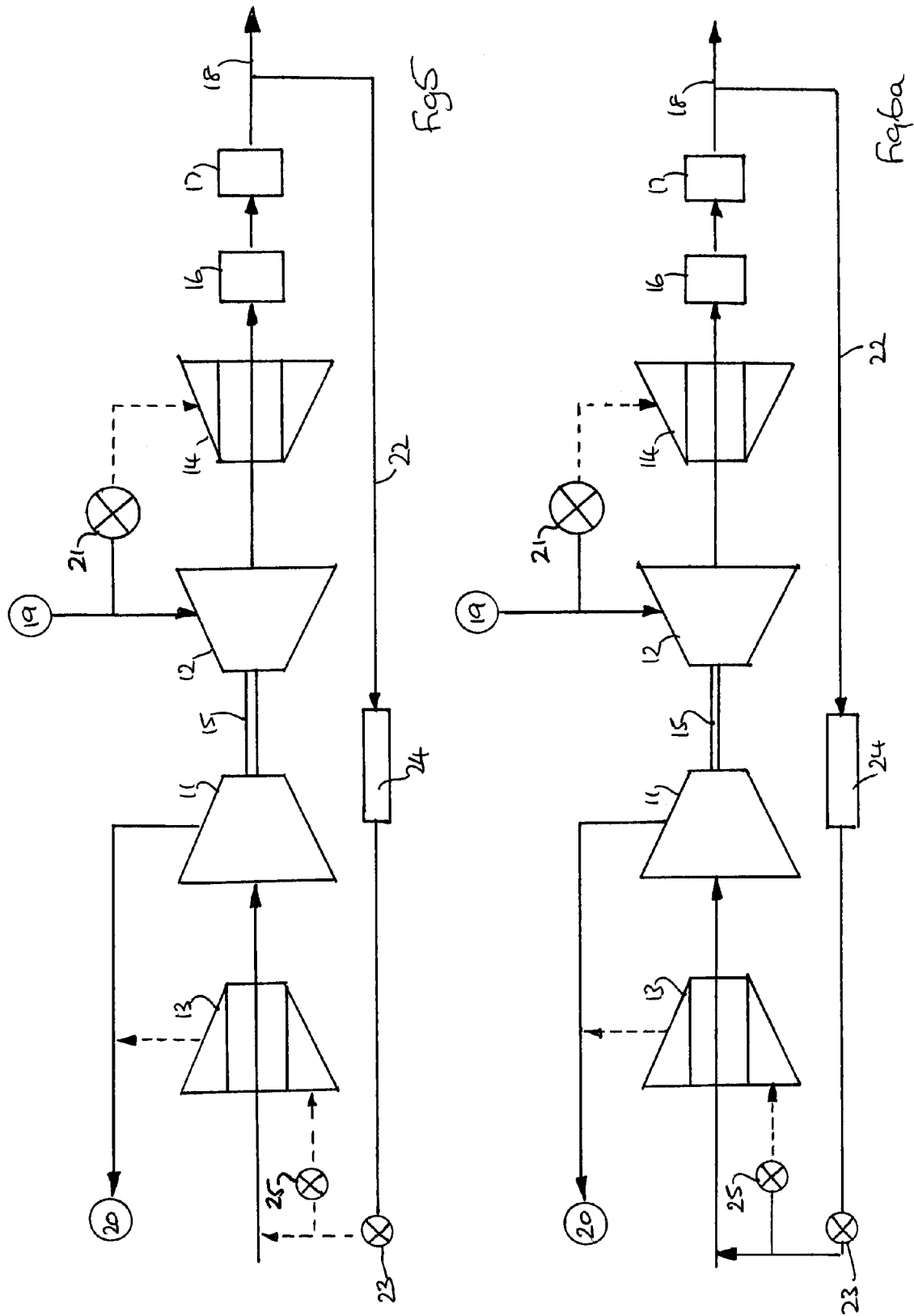

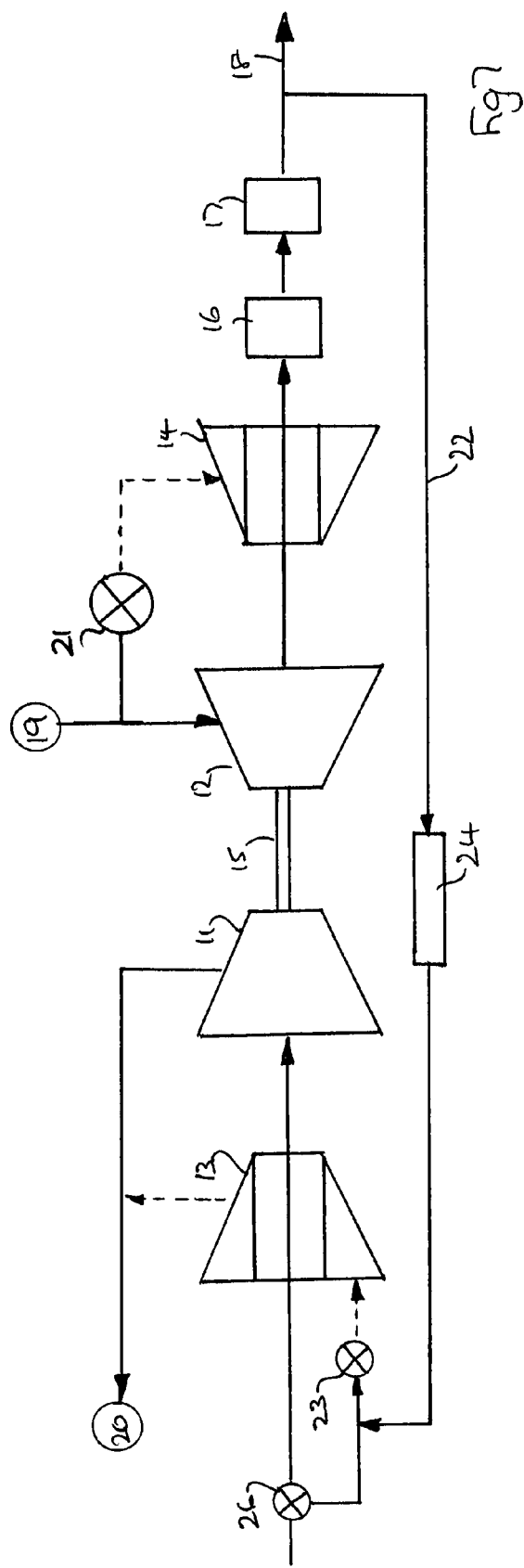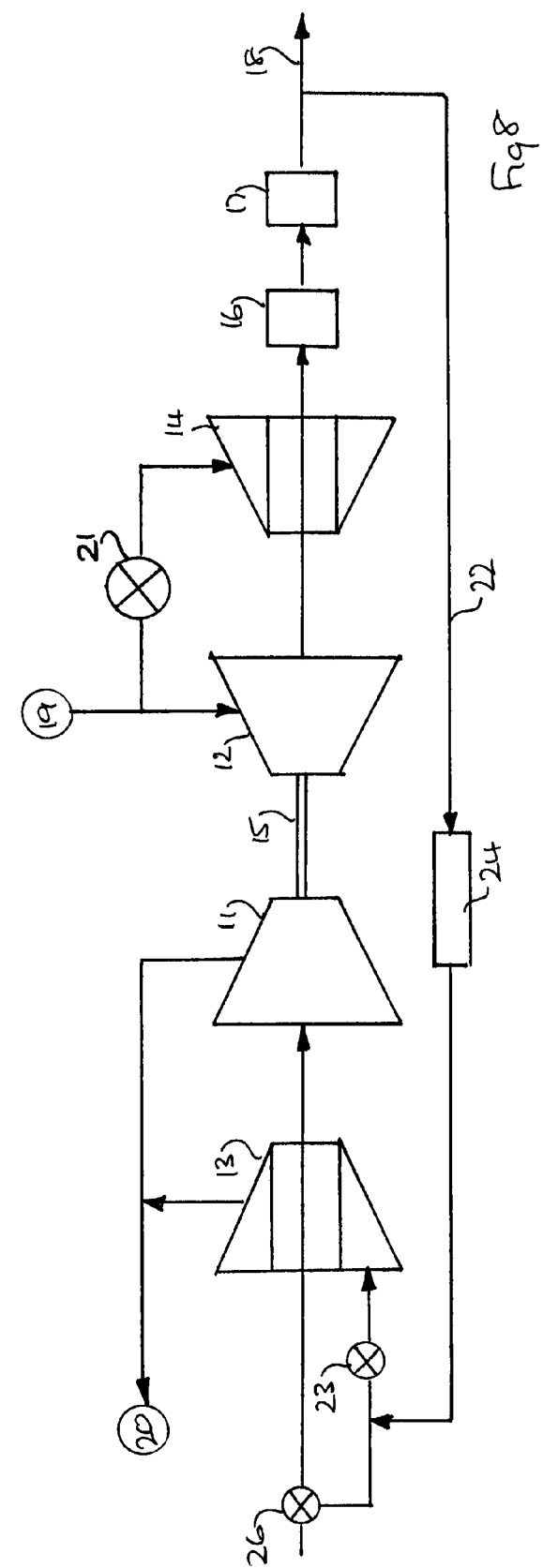

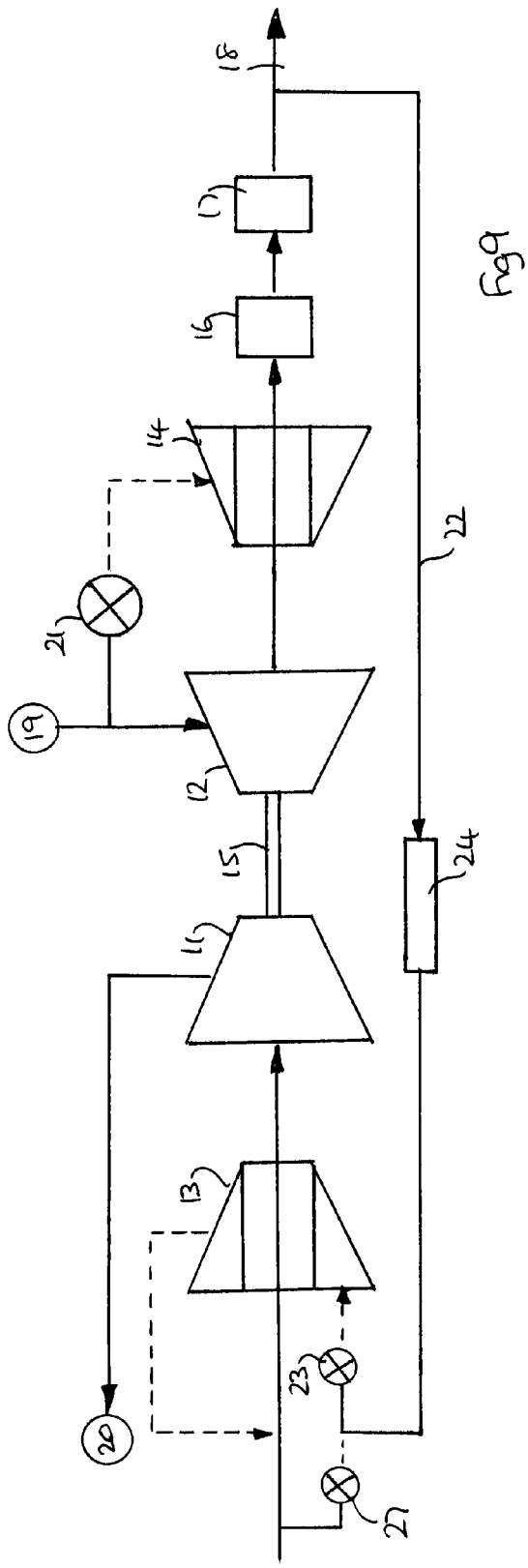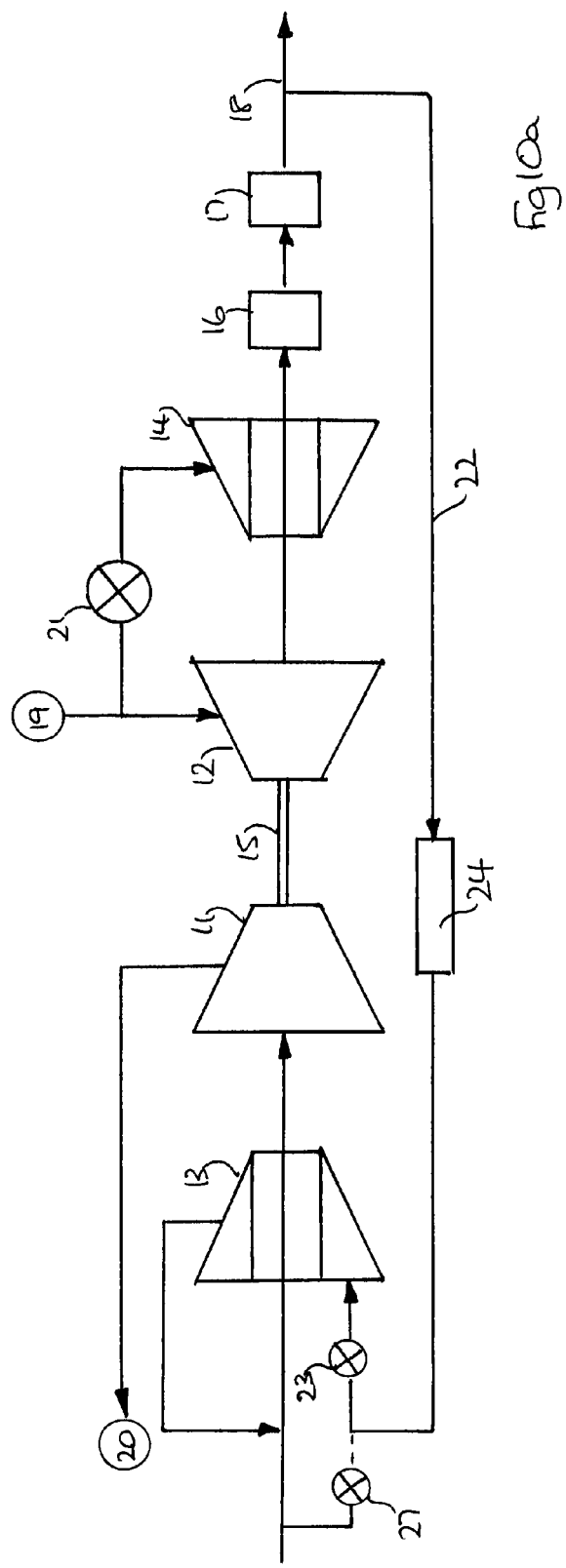

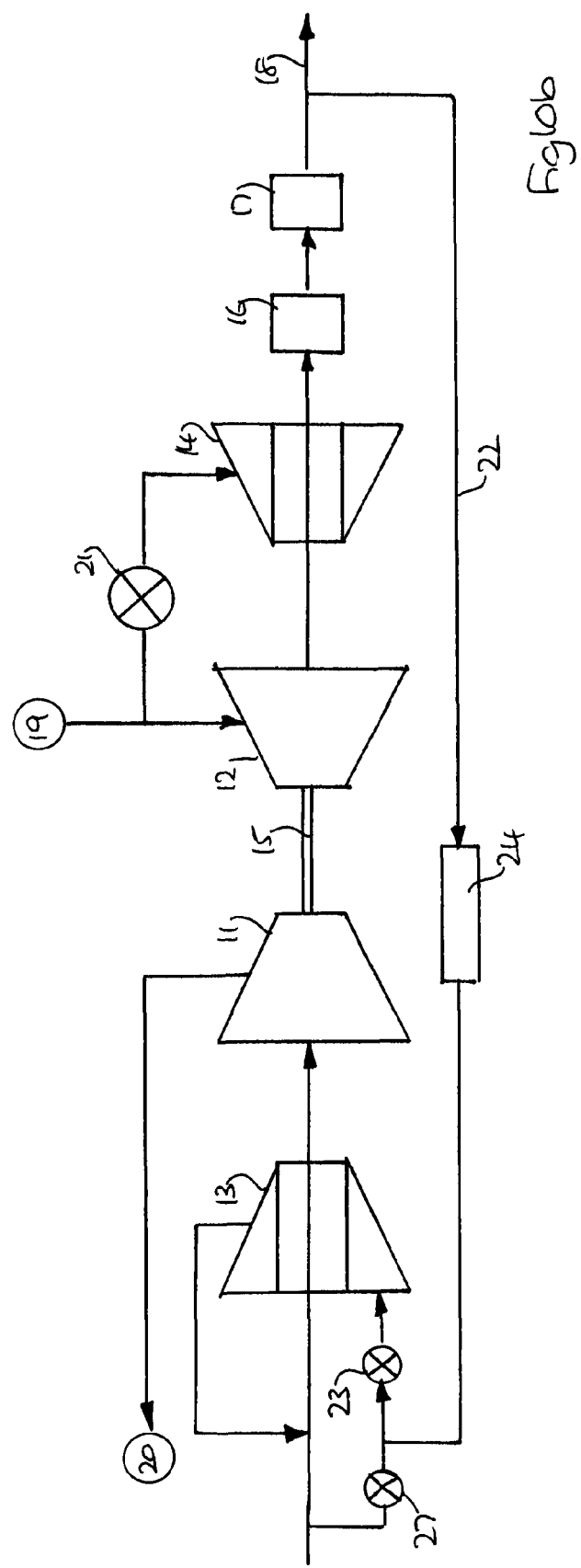

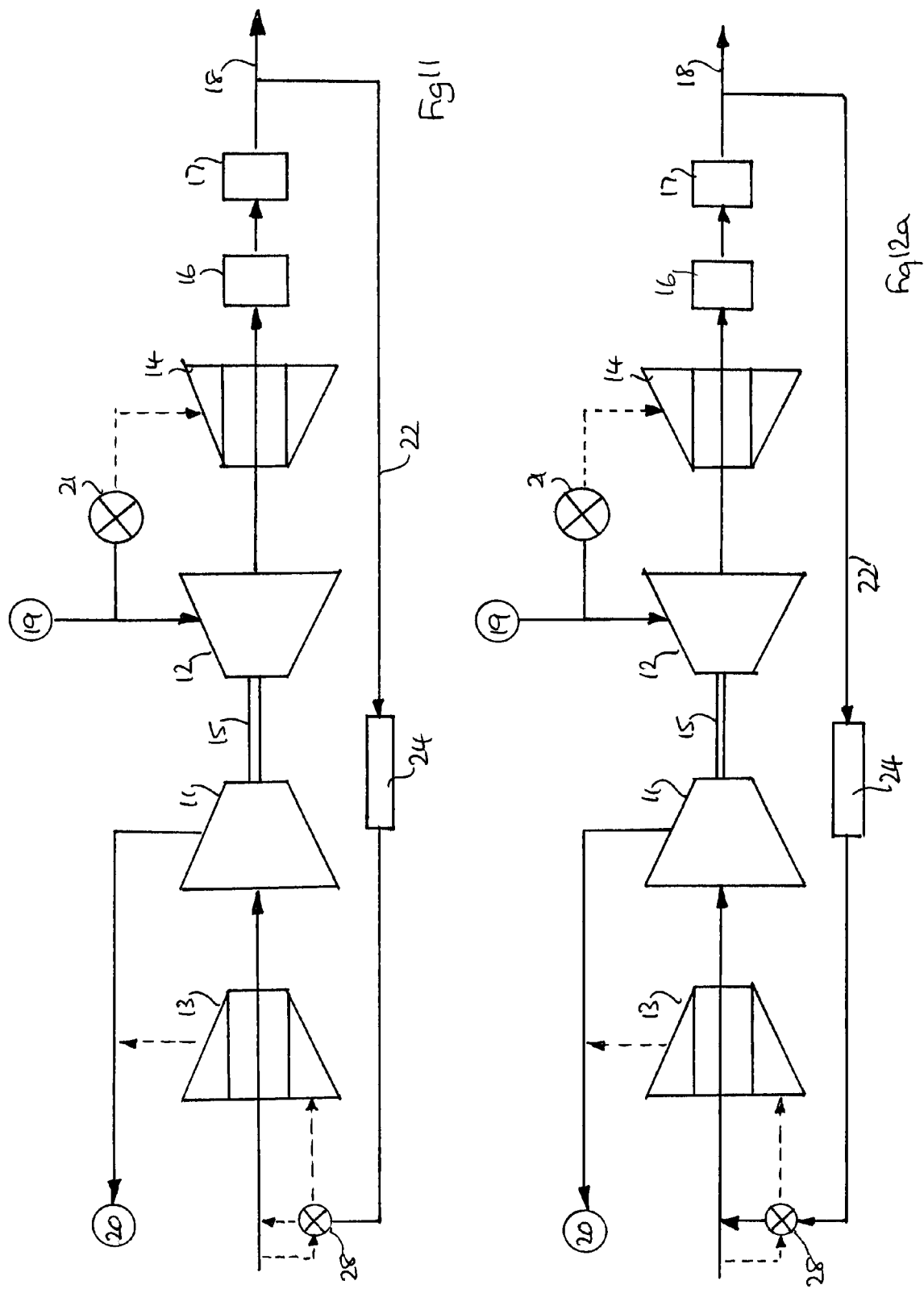

TURBO PUMP

FIELD

This invention relates to a turbo pump for a vehicle engine, and in particular to an exhaust driven turbo pump incorporating a turbocharger. Aspects of the invention relate to a pump, to an assembly, to a system, to an engine and to a vehicle.

BACKGROUND

Exhaust driven turbochargers for vehicle engines are well known. A turbine of the turbocharger driven by exhaust gas, drives a compressor on the inlet side, and thereby increases the charge volume of each combustion cycle of the engine.

Also known is the technique of exhaust gas recirculation (EGR), whereby exhaust gas is re-circulated to the inlet side of the engine to dilute the fresh air charge during a cold engine start for the purpose of reducing noxious emissions.

High pressure EGR provides exhaust gas from at or adjacent the exhaust manifold. This arrangement is somewhat disadvantageous since the exhaust gas stream is hot, and thereby increases the temperature of the inlet charge upon mixing therewith. Also such exhaust gas is unfiltered, and thus contains carbon and other contaminants which may cause deterioration of engine lubricant.

So-called low pressure EGR is an alternative which provides exhaust gas from a point in the exhaust system downstream of the usual diesel oxidation catalyst (DOC) and diesel particle filter (DPF). Such gas is relatively cool and clean, but is substantially at tail pipe pressure. The consequence of relatively low pressure is that insufficient volume may flow, or be drawn, into the engine inlet tract. A pump may thus be provided to ensure that a sufficient volume of relatively cool and clean exhaust gas can be provided to the inlet tract on demand.

SUMMARY OF THE INVENTION

It is against this background that the present invention has been conceived. Embodiments of the invention may provide an improved pump that addresses the above issues. Other aims and advantages of the invention will become apparent from the following description, claims and drawings.

According to one aspect of the present invention there is provided an exhaust turbo pump assembly of a vehicle engine, and having paired compressor and turbine wheels rotatable about a common axis, an inner pair of said wheels being connected by a tubular shaft rotatable relative to a spindle passing through said shaft and connecting an outer pair of said wheels, one pair of wheels comprising an exhaust driven turbocharger, and another pair of said wheels comprising an exhaust driven turbo pump for exhaust gas re-circulation to the engine inlet tract. Such a pump is referred to herein as an EGR turbo pump.

Such an arrangement may provide a compact turbo pump assembly in which the pairs of compressor and turbine wheels operate independently about the same rotational axis to provide a turbocharger and an EGR turbo pump.

In one embodiment a dual turbo pump assembly is provided. Additional pairs of turbine and compressor wheels may be provided and linked by a respective tubular shaft rotatable on the common axis. For example a triple turbo pump assembly may comprise a two stage turbocharger, and an EGR turbo pump.

In an embodiment of the invention, outer wheels of the turbo pump assembly are annular, the through passages providing gas flow paths to respective inner wheels.

In an embodiment of the invention, the EGR turbo pump is operable on demand, and includes a closure valve upstream of the turbine wheel thereof. The closure valve may be closed, so that active rotation of the turbine wheel of the EGR pump is obviated and all exhaust gas passes through the turbocharger turbine wheel. The closure valve may be opened progressively to provide for increasing flow over the EGR pump turbine wheel, so as to achieve a desired pumping effect from the EGR pump compressor wheel which is paired therewith.

The turbocharger may include a conventional wastegate or the like to avoid overpressure thereof and/or to divert flow which the turbocharger turbine cannot accommodate.

In one embodiment, the turbocharger comprises an inner pair of wheels whereas the EGR turbo pump comprises an outer pair of wheels.

In an embodiment of the invention, the outlet of the compressor wheel of the EGR turbo pump and the outlet of the compressor wheel of the turbocharger are connected. In this arrangement exhaust gas which has been pressurized by the EGR turbo pump mixes with pressurized inlet air from the turbocharger at a location downstream of both compressor wheels.

In another embodiment the outlet of the compressor wheel of the EGR turbo pump and the inlet of the compressor wheel of the turbocharger are connected. In this arrangement a relatively lower pressure of exhaust gas is required for mixing in the inlet tract upstream of the turbocharger compressor wheel.

The compressor wheel of the EGR turbo pump is sized to provide a sufficient flow of re-circulated exhaust gas at the mixing location, and suitable pressure regulators, flow restrictors and/or non-return valves may be provided as required.

In an embodiment of the invention, re-circulated exhaust gas may be provided directly to the inlet tract upstream of the turbocharger compressor and without additional pressurization from the EGR turbo pump. Such an arrangement provides additional options for mixing and distributing exhaust gas to the inlet side of the engine, and may supplement exhaust gas introduced via the EGR turbo pump. Suitable diverter valves and/or flow restrictors may be incorporated to ensure that a desired proportion of exhaust gas flows via the respective paths.

In another embodiment, clean air from the inlet tract of the engine may be introduced into the exhaust gas re-circulation duct upstream of the compressor wheel of the EGR turbo pump. A suitable valve, which may allow flow control, thus permits dilution of re-circulated exhaust gas; this may be useful to achieve a desired proportion of re-circulated exhaust gas in the engine inlet charge.

The thus diluted exhaust gas subsequently passes through the EGR turbo pump compressor wheel and is directed either to the inlet tract upstream of the turbocharger compressor, or to a point downstream of turbocharger compressor and preferably upstream of an intercooler of the engine inlet tract.

In another embodiment a four-way valve may be provided in the exhaust re-circulation duct upstream of the EGR turbo pump compressor. Such a valve comprises an exhaust gas inlet, a fresh air inlet from the inlet tract, an outlet to the inlet tract upstream of the turbocharger compressor, and an outlet to the EGR turbo pump compressor.

In use the four-way valve may be closed, to prevent exhaust gas re-circulation, or may be open to permit one of:
a) direct admission of unpressurized exhaust gas to the inlet tract of the engine;
b) direct admission of unpressurized exhaust gas to the EGR turbo pump compressor;
c) a combination of a) and b) in a desired proportion;
d) dilution of the re-circulated exhaust charge with fresh air from the inlet tract, the combined flow passing to the EGR turbo pump compressor; and
e) a combination of a) and d).

The various flow paths provided by embodiments of the invention allow mixing of re-circulated exhaust gas at several locations upstream and downstream of the turbocharger compressor. These variations also permit advantageous mixing of relatively hot and relatively cool gas in proportions which may also achieve a desirable gas temperature profile at locations on the engine inlet side.

Within the scope of this application it is envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

BRIEF DESCRIPTION OF DRAWINGS

Embodiments of the present invention will now be described, by way of example only, with reference to the accompanying drawings, in which:

FIGS. 1 & 2 represent schematically a first embodiment of the invention in 'OFF' and 'ON' states;

FIGS. 3 & 4 represent schematically a second embodiment of the invention in 'OFF' and 'ON' states;

FIGS. 5, 6a & 6b represent schematically a third embodiment of the invention in 'OFF' and 'ON' states;

FIGS. 7 & 8 represent schematically a fourth embodiment of the invention in 'OFF' and 'ON' states;

FIGS. 9, 10a & 10b represent schematically a fifth embodiment of the invention in 'OFF' and 'ON' states; and FIGS. 11 & 12a-12e represent schematically a sixth embodiment of the invention in 'OFF' and 'ON' states.

DETAILED DESCRIPTION

Figure 6B:
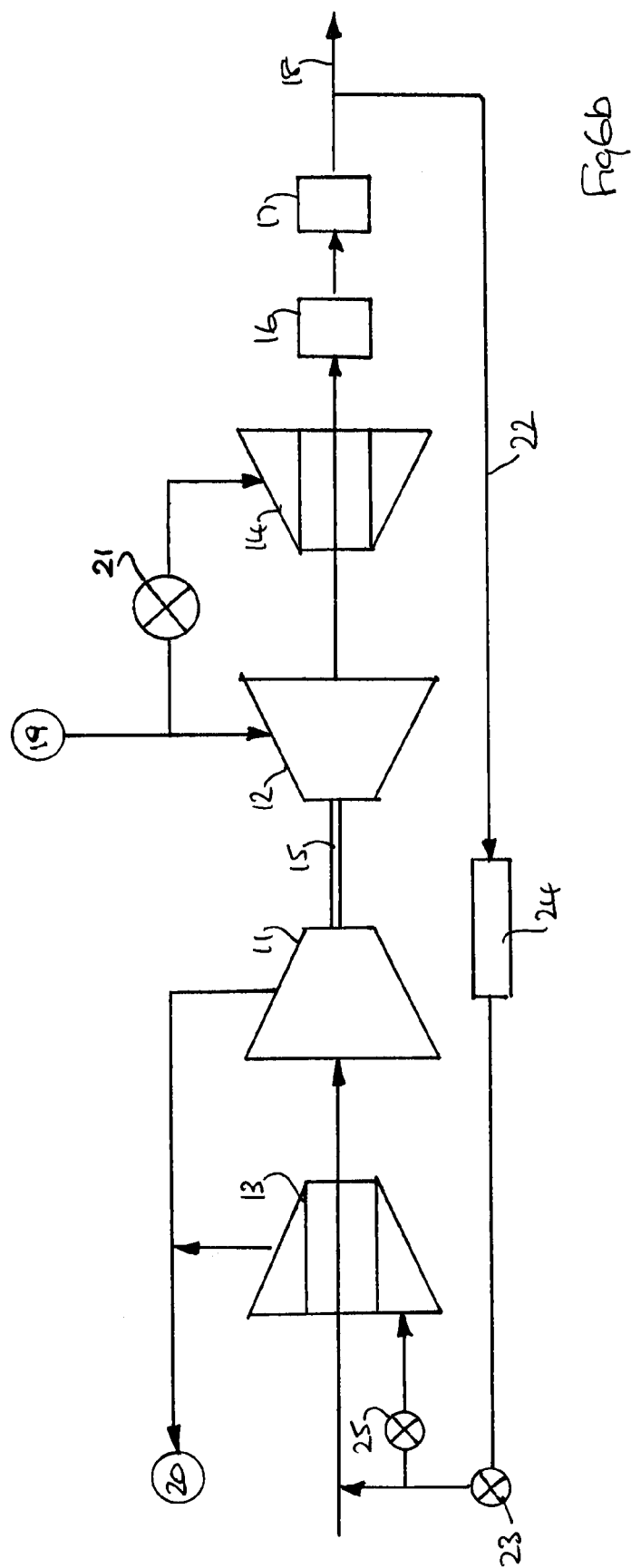

In the accompanying drawings, a dual turbo pump assembly is illustrated schematically. Paired turbine and compressor wheels, 11, 12 and 13, 14 are mounted for rotation about a common axis, the inner pair 11, 12 being coupled by a tubular shaft 15, and the outer pair 13, 14 being coupled by a shaft (not shown) running within the tubular shaft 15.

Each pair of wheels is independent of the other, and the outer pair 13, 14 are annular to permit flow to and from the inner pair, as will become apparent from the following description.

In use flow control valves are provided to direct flow to one or other turbine wheel, and to one or other compressor wheel. The inner pair of wheels 11, 12 comprise a conventional turbocharger of an internal combustion engine, and the outer pair of wheels comprise a pump for low pressure exhaust gas which is re-circulated to the engine inlet side (an EGR turbo pump).

With reference to FIG. 1, the dual turbo pump assembly consists of exhaust driven turbines 12, 14 supplied with exhaust gas from the exhaust manifold 19 of a diesel engine (not shown). After passing through the turbine stages, exhaust gas passes through a diesel oxidation catalyst 16 and a diesel particulate filter 17 to an exhaust tailpipe 18. In the tailpipe exhaust gas pressure may be characterized as low, compared with exhaust gas pressure upstream of the turbo pump assembly.

In the drawings potential flow paths are indicated by dotted line whereas actual flow paths are indicated by solid line.

FIG. 1 illustrates a configuration where the turbine 14 associated with the EGR turbo pump is not active—an exhaust stream supply valve 21 is closed, and all exhaust gas flow is via the turbine 12 which forms part of the engine turbocharger. Exhaust flow passes through a central aperture in the turbine 14, but imparts no substantial rotational force thereto, though some free-wheeling may be intentionally permitted to ensure lubrication of the bearings thereof.

In this arrangement, the compressor wheel 11 of the turbocharger operates conventionally to charge the inlet manifold 20 of the engine, and receives inlet air through a central aperture of the compressor wheel 13, which may freewheel due to the connection to the turbine 14.

An exhaust gas re-circulation tract 22 directs exhaust gas toward the compressor wheel 13, but the tract is closed in this embodiment by valve 23.

Thus in the embodiment of FIG. 1, the EGR pump is 'off'.

In FIG. 2, the EGR pump is 'on', and the valve 21 permits flow via the turbine 14, which in turn drives the compressor wheel 13. The valve 23 is also open to permit the compressor wheel 13 to draw EGR gas via duct 22 and pump it to the inlet manifold 20 so as to supplement pressurized air from the compressor wheel 11. Mixing of EGR gas and inlet air preferably occurs upstream of a conventional air to air intercooler (not shown), located upstream of the inlet manifold 20.

This embodiment permits re-circulation of exhaust gas which is at too low a pressure to flow effectively into the inlet manifold without pumping.

Design and specification of suitable turbine and compressor wheels, valves, flow rates and other variables is within the ability of an appropriately skilled person, and need not be further described here.

In the event that the temperature of re-circulating exhaust gas is too high, a suitable cooler 24 may be incorporated into the EGR duct, for example a gas/water cooler associated with the engine cooling system.

An alternative arrangement is illustrated in FIGS. 3 and 4. The same components are given identical reference numerals.

This embodiment corresponds to that of FIGS. 1 and 2 save that pressurized exhaust gas passes from the compressor wheel 13 to mix with inlet air upstream of the compressor wheel 11. FIG. 3 shows the 'off' configuration in which valves 21 and 23 are closed. FIG. 4 shows the 'on' configuration in which low pressure exhaust gas is pumped to the air inlet duct. The arrangement of FIGS. 3 and 4 may provide better mixing of gases, and an alternative configuration for installing within a congested engine compartment.

In the configuration illustrated in FIGS. 5 and 6a, the exhaust side is unchanged. FIG. 5 represents an 'off' state whereas FIG. 6a shows an 'on' state whereby exhaust gas passes directly to the air inlet tract, and is unboosted. A second valve 25 of the EGR duct closes a flow path to the compressor wheel 13.

The mixture of EGR gas and air is boosted by the compressor wheel 11, to supply the inlet manifold 20.

In the embodiment of FIG. 6b, the valve 25 is also opened to permit a proportion of exhaust gas to be boosted directly to the inlet tract downstream of the compressor wheel 11. Flow restrictors, or other means may be provided to determine the flow proportions of the two pathways for the EGR gas stream.

Yet another arrangement is illustrated in FIGS. 7 and 8. The exhaust side is unchanged. FIG. 7 represents the 'off' state, and FIG. 8 the 'on' state.

An additional valve 26 is incorporated in the air inlet tract whereby air may be directed to mix with the EGR gas upstream of the compressor wheel 13. Again, flow restrictors or other means may be provided to determine the proportion of air directed towards valve 23 for mixing with the EGR stream.

Whilst the valve 26 can be open in FIG. 7, it will be understood that it may also be closed in order to obviate any risk of back flow through the EGR duct 22. When the valves 26 and 23 are open (FIG. 8), the EGR stream mixes with fresh air in a desired proportion.

FIGS. 9, 10a and 10b illustrate another embodiment having valves 23, 27 corresponding closely to FIGS. 7 and 8, but a flow path for boosted EGR gas which is directed to the air inlet upstream of the compressor wheels. The exhaust side is unchanged.

Thus in the 'off' configuration of FIG. 9, valves 23 and 27 are closed, and EGR flow is prevented.

In the 'on' configuration of FIG. 10a, valve 23 is opened to permit exhaust gas to be boosted by compressor wheel 13 and admitted to the air inlet tract (this arrangement also corresponds to FIG. 4).

In the 'on' configuration of FIG. 10b, the valve 27 is also opened to permit dilution of the exhaust gas entering compressor wheel 13.

Another embodiment is illustrated in FIGS. 11 and 12a-12e. FIG. 11 represents an 'off' configuration, whereas FIGS. 12a-12e illustrate various 'on' configurations. In these embodiments, a 4-way valve 28 is provided in the EGR duct.

In the first 'on' condition (FIG. 12a) exhaust gas is directed to the inlet duct upstream of the compressor wheel 11 (also corresponding to FIG. 6a) and is unboosted.

Figure 12B:
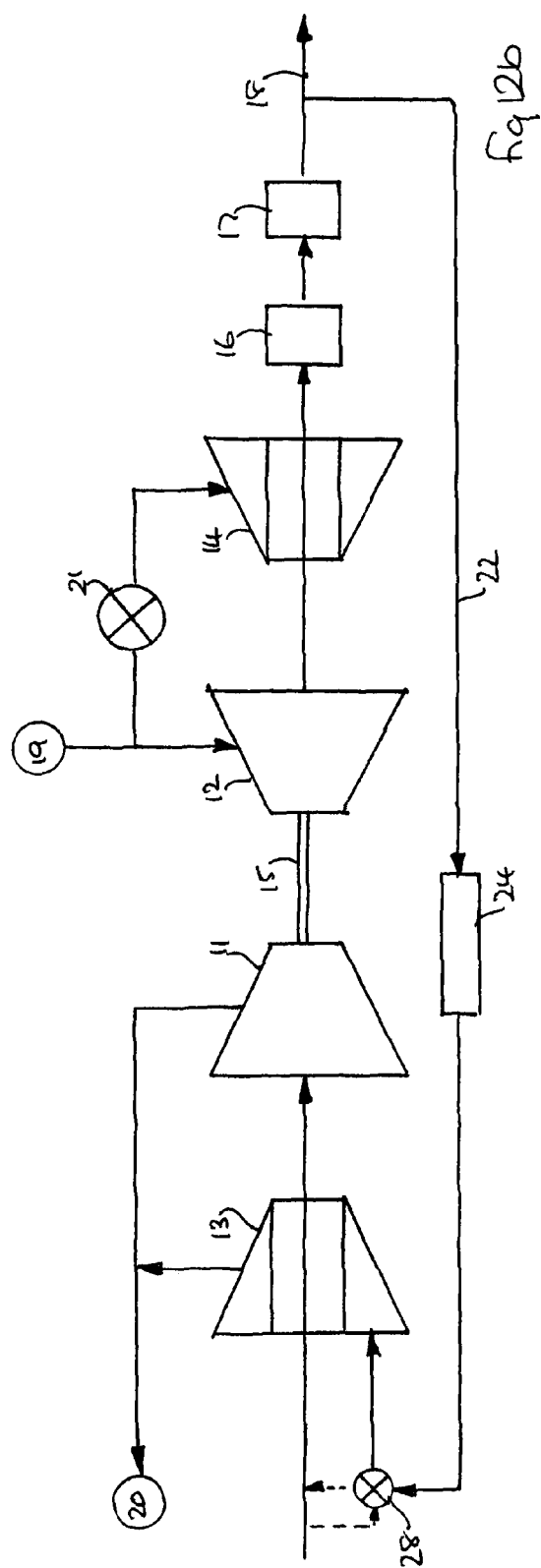

In FIG. 12b, exhaust gas is boosted via the compressor wheel 13 (also corresponding to FIG. 2).

Figure 12C:
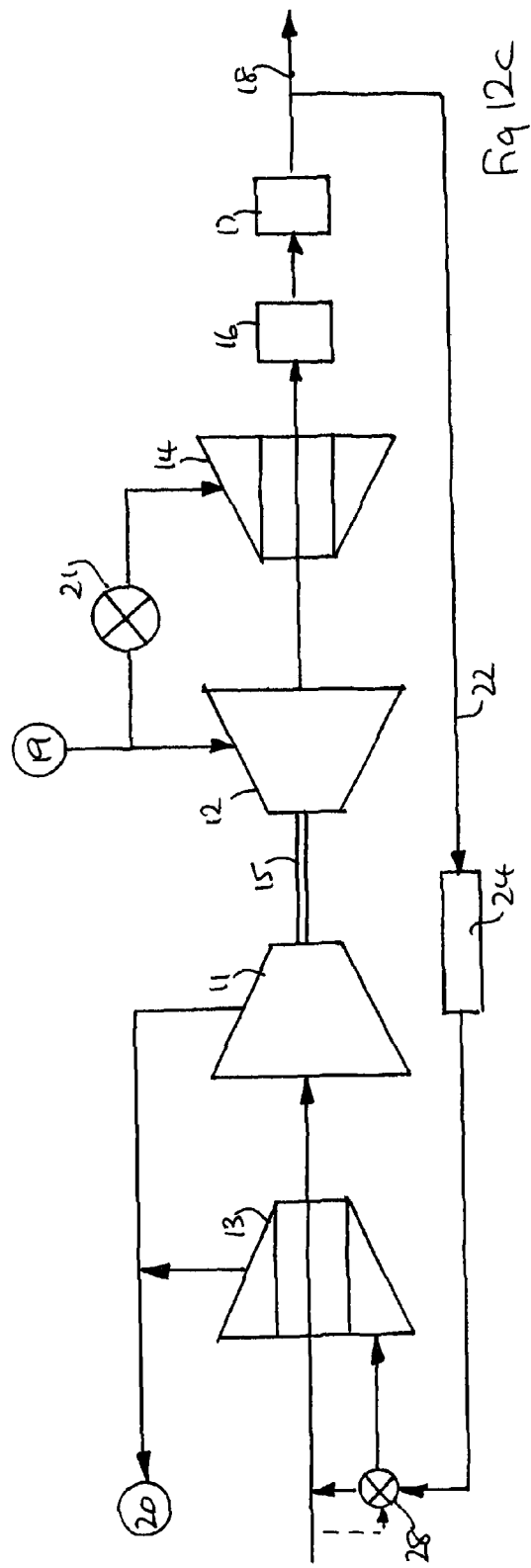

In FIG. 12c, exhaust gas is both boosted and supplied directly to the inlet tract (also corresponding to FIG. 6b).

Figure 12D:
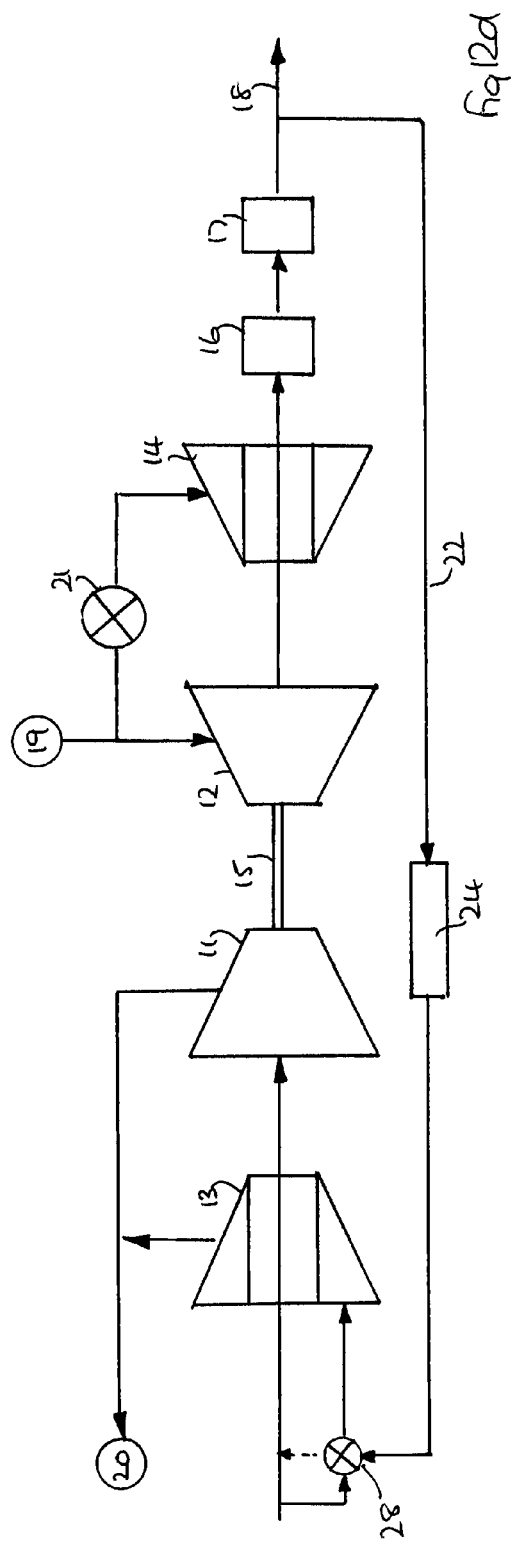

(In FIG. 12d, the valve 28 directs inlet air to mix with exhaust gas upstream of the compressor wheel 13 (also corresponding to FIG. 8).

Figure 12E:
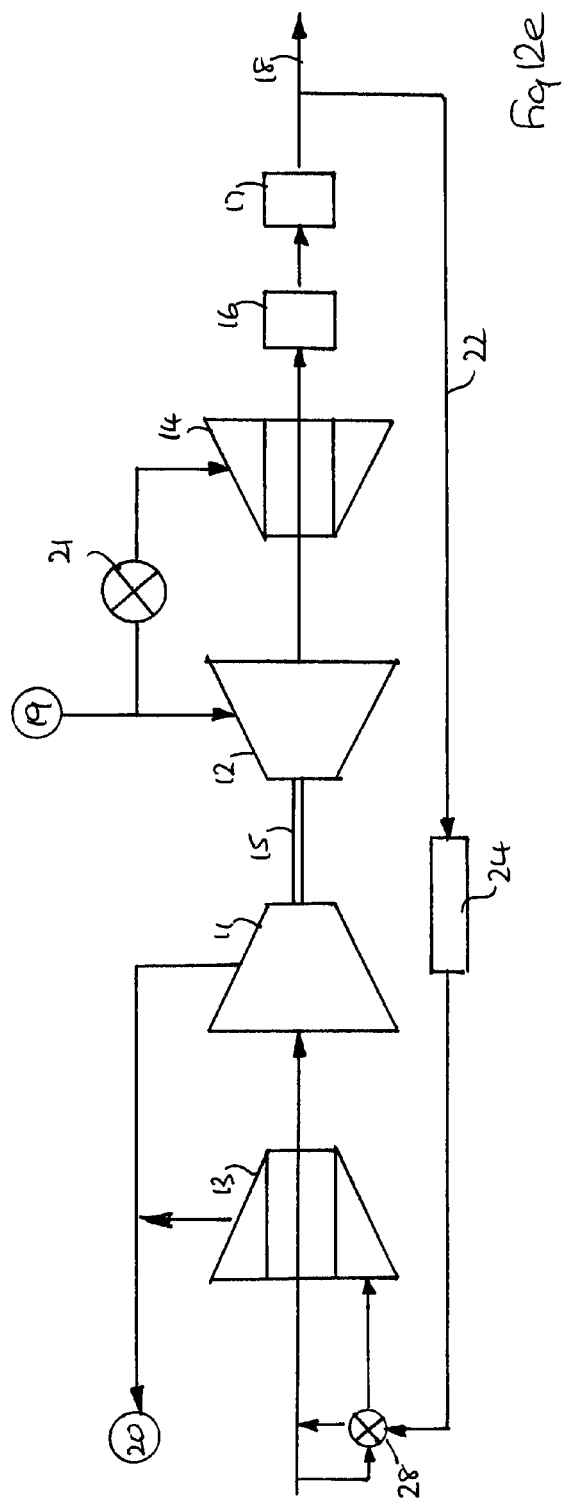

In FIG. 12e, inlet air and exhaust gas are mixed, and proportions supplied to both the inlet tract upstream of compressor wheel 13 and to compressor wheel 11.

The different flow paths permitted by the configurations described herein can both accommodate installations in engine compartments which are congested, and permit mixing of exhaust gas and fresh air in suitable proportions to achieve a desirable charge to the inlet manifold. In particular it may be possible to achieve desirable temperatures of an inlet charge in addition to a desired proportion of exhaust gas and air.

The invention claimed is:

1. A pump assembly for an internal combustion engine, comprising
paired turbine and compressor wheels rotatable about a common axis, an inner pair of said wheels being connected by a tubular shaft rotatable relative to a spindle passing through said shaft and connecting an outer pair of said wheels, each wheel of the outer pair of said wheels having a central aperture defining a through passage for gas flow to the inner pair of said wheels, one of said pairs comprising a turbocharger for an inlet of said engine, and another one of said pairs comprising a pump for exhaust gas re-circulated to said inlet.

2. An assembly according to claim 1, and having two pairs of turbine and compressor wheels.

3. An assembly according to claim 2, wherein the turbocharger comprises the inner pair of said wheels.

4. An assembly according to claim 1, wherein said spindle is journalled in said tubular shaft.

5. An assembly according to claim 1, and including a valve operable to control exhaust gas flow through a turbine of said pump.

6. An EGR system comprising:
paired turbine and compressor wheels rotatable about a common axis, an inner pair of said wheels being connected by a tubular shaft rotatable relative to a spindle passing through said shaft and connecting an outer pair of said wheels, each wheel of the outer pair of said wheels having a central aperture defining a through passage for gas flow to the inner pair of said wheels, one of said pairs comprising a turbocharger for an inlet of an internal combustion engine, and another one of said pairs comprising a pump for exhaust gas re-circulated to said inlet;
an exhaust gas return duct; and
a closure valve in the exhaust gas return duct.

7. An EGR system according to claim 6, wherein said duct incorporates a cooler to reduce the temperature of gas flowing therethrough.

8. An EGR system according to claim 7, wherein said valve is operable to direct exhaust gas to the compressor wheel, an outlet of said pump being connected to the inlet of the engine downstream of the compressor wheel of said turbocharger.

9. An EGR system according to claim 7, wherein said valve is operable to direct exhaust gas to the compressor wheel of said pump, an outlet of said pump being connected to the inlet of the engine upstream of the compressor wheel of said turbocharger.

10. An EGR system according to claim 8, wherein said valve is operable to direct a selectable proportion of exhaust gas flow to said upstream of the compressor wheel of said turbocharger.

11. An EGR system according to claim 8, wherein said valve is operable to admit air from the inlet of the engine to supplement exhaust gas directed to the compressor wheel of said pump.

12. An EGR system according to claim 6, wherein said closure valve comprises a plurality of valve elements operable in combination to achieve a desired flowpath.

13. An EGR system according to claim 6, wherein said closure valve comprises a multi-path valve having a switchable valve element to achieve a desired flowpath.

14. An EGR system according to claim 6, and comprising a casing having a single air inlet, a single exhaust outlet, a single connection for an inlet manifold and a single connection for an exhaust manifold.

15. A vehicle, comprising:
an internal combustion engine; and
paired turbine and compressor wheels rotatable about a common axis, an inner pair of said wheels being connected by a tubular shaft rotatable relative to a spindle passing through said shaft and connecting an outer pair of said wheels, each wheel of the outer pair of said wheels having a central aperture defining a through passage for gas flow to the inner pair of said wheels, one of said pairs comprising a turbocharger for an inlet of said engine, and another one of said pairs comprising a pump for exhaust gas re-circulated to said inlet.

* * * * *